June 29, 1971  KIMIKAZU AZUMA  3,588,955

EXTRUDING APPARATUS

Filed Sept. 27, 1968

INVENTOR
KIMIKAZU AZUMA
BY
Woodhams, Blanchard & Flynn
ATTORNEYS

United States Patent Office 3,588,955
Patented June 29, 1971

3,588,955
EXTRUDING APPARATUS
Kimikazu Azuma, 3-18 Matsugaoka, 3-chome,
Kugenuma, Fujisawa-shi, Kanagawa-ken, Japan
Filed Sept. 27, 1968, Ser. No. 763,243
Claims priority, application Japan, Aug. 21, 1968,
43/59,129
Int. Cl. B29f 1/02, 1/04, 1/08
U.S. Cl. 18—12                                    6 Claims

ABSTRACT OF THE DISCLOSURE

An apparatus for extruding thermoplastic resins, comprising an extruder provided with a heating zone for melting a thermoplastic resin, a foaming agent injection and dispersing zone for incorporating the foaming agent into the molten resin, and a cooling unit provided at the foremost end of said extruder for regulating the temperature of the resulting foamable molten resin.

BACKGROUND OF THE INVENTION

(a) Field of the invention

The present invention is concerned with an apparatus for incorporating a foaming agent into a molten thermoplastic resin, and more particularly, it relates to an extruding apparatus for obtaining a multi-cellular foamed article by incorporating a foaming agent which is normally in liquid state into a molten thermoplastic resin.

(b) Description of the prior art

Various types of extruding apparatuses have been used in the past to obtain multi-cellular foamed articles by extruding molten thermoplastic resins. One such type consists of a single barrel type extruding machine which is provided with a heating zone for melting a thermoplastic resin, a foaming agent injection zone for admixing said foaming agent in the molten resin, and a cooling zone for cooling the resulting mixture. The extruding machine of this type is such that each of said zones is equipped with either heating means or cooling means which are generally provided exteriorly of the cylinder of the extruding machine. However, such a cylinder is of a wall thickness sufficient for resisting the relatively high internal pressure and accordingly the cylinder is low in heat conductivity. Therefore, in order to effect a quick regulation of the temperature of the foamable molten resin which is transferred under pressure through the cylinder by a screw, it was necessary to increase the proportion occupied by the aforesaid heating and cooling means in the extruding machine. Such an increased proportion of these means, in turn, necessitated a substantial increase in the longitudinal as well as the radial size of the extruding machine. Above all, the cooling zone constitutes an important section in that it is assigned with controlling the foamable molten resin, which is in the stage of being immediately before being extruded, so as to be placed under the desirable temperature condition. Whether or not the cooling section has a satisfactory cooling function bears a decisive influence on the efficiency of production and also on the quality of the articles produced. For this reason, the attempt of securing a sufficient function of the cooling means gave rise to the necessity for increasing the proportion occupied by the cooling zone so as to correspond to the desired cooling function. This led to the tendency toward a further increase in the lengthwise as well as radialwise size of the extruding machine.

Also, an apparatus of the type comprising the combination of an extruder equipped with a heating zone and a foaming agent injecting zone and another extruder equipped with only a cooling zone, and being operable in such a way that the molten resin located within the cylinder of the extruder is adapted to be cooled both internally and outwardly of the cylinder by the cooling medium which is passed through the interior of the screw shaft of the cooling extruder is known. However, the extruding apparatus of this type is disadvantageous in that it is uneconomical from the aspect of power cost because the apparatus consists of two separate extruders and also that the cooling mechanism which is required for the aforesaid internal cooling operation inevitably becomes complicated.

SUMMARY OF THE INVENTION

It is, therefore, an object of the present invention to provide an improved extruding apparatus which is operable in such a way that the thermoplastic resin which has been melted in the extruder thereof and has further been made foamable by the foamable agent injected and dispersed in said molten resin can be easily placed as desired, in the stage immediately before being extruded from the apparatus, under a temperature condition which is suitable for the expansion of the extruded resin.

Another object of the present invention is to provide an extruding apparatus which has a reduced overall length and which, accordingly, will require no extensive space for its installation.

Other objects and the attendant advantages of the present invention will become apparent by reading the following detailed description in conjunction with the accompanying drawings.

The extruding apparatus of the present invention consists of a combination of an extruder having an improved structure and novel means for regulating the temperature of the foamable molten resin contained in the extruder to a condition suitable for the extrusion of the resin for expansion.

According to the temperature regulating means of the present invention, the temperature of the foamable molten resin can be regulated quickly as desired and the molten resin can be extruded in the form of a foamed article in a desirable state.

DESCRIPTION OF THE PREFERRED EMBODIMENTS

The drawings illustrate a couple of embodiments of the present invention, both of which are intended for producing articles of foamed resins from molten thermoplastic resins containing a foaming agent which is incorporated therein by injection.

Figure 1:
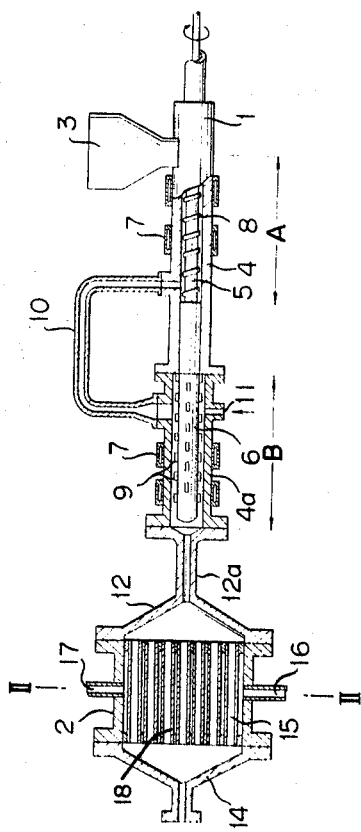
FIG. 1 is a side elevation of an embodiment, partly in section, of the present invention.

The extruding apparatus shown in FIG. 1, which is one embodiment of the present invention, comprises a feed hopper 3, a cylinder consisting of sections 4 and 4a which are integrally united together by bolts not shown, a rotatable screw 5 provided within the cylinder, an extruder 1 which contains an element represented by a stirring shaft 6, and a cooling unit 2 which is provided at the foremost end of the extruder. As shown in the drawings, the extruder 1 is divided into two functional zones, i.e. a heating zone A and an injection and dispersing zone B in this order in the direction of extrusion.

A cylinder 4 located in the zone A is provided with a heating jacket 7. This jacket 7 is so structured that either electric heaters not shown are disposed thereinside or an arrangement is provided so as to circulate a liquid heating medium thereinside. The screw 5 is provided with a helical land 8 for forcibly advancing the resin. The cylinder 4a in the zone B is equipped with a heating jacket 7 similar in type to the jacket 7 in the zone A. The stirring shaft 6 is equipped, radially thereof, with a plurality of stirring vanes 9 which are aligned in a row in the axial direction on the external circumferential periphery of the shaft by leaving a small clearance from the inner wall face of the cylinder 4a. The cylinder 4 is adapted to communicate with the cylinder 4a by means of a curved pipe 10 having a relatively small diameter. The cylinder 4a is provided with an inlet 11 of the foaming agent at a site which is substantially opposite to the opening of said curved pipe 10.

To the foremost end of the cylinder 4a, there is attached a funnel-like distributing pipe 12 which is adapted to communicate with said foremost end of the cylinder 4a. A multi-pipe type heat-exchanger 2 for cooling the foamable resin is provided, via the aforesaid distributing pipe, to the foremost end of the cylinder 4a. To the forward end of this heat-exchanger 2 is attached a funnel-shape collecting pipe 14. The heat-exchanger 2 contains a chamber 15 in surrounding relationship to a plurality of through pipes 18 which provide communication between the distributing pipe 12 and the collecting pipe 14. This heat-exchanger 2 is provided, in a manner not shown, with an inlet 16 and an outlet 17 for passing a liquid cooling medium through said chamber and discharging the cooling medium therefrom.

Figure 3:
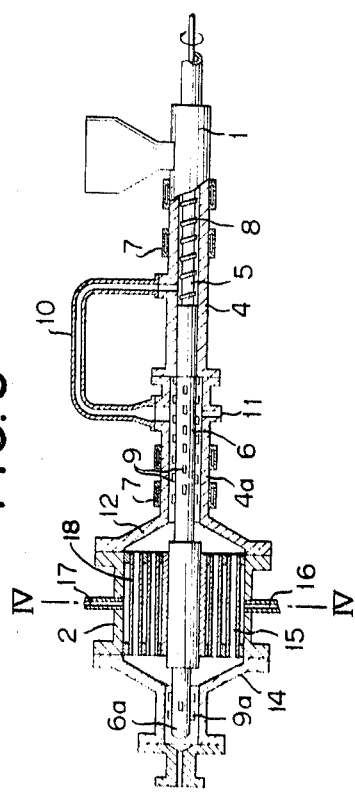
FIG. 3 is a side elevation of another embodiment, partly in section, of the present invention.
Figure 2:
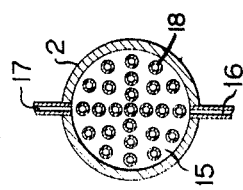
FIG. 2 is a cross sectional view taken along the line II—II in FIG. 1.
Figure 4:
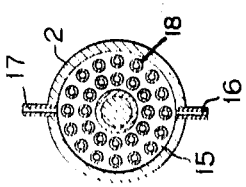
FIG. 4 is a cross sectional view taken along the line IV—IV in FIG. 3.

FIG. 3 is a partial modification of the apparatus of FIG. 1, which has nothing different from the apparatus shown in FIG. 1 excepting that the stirring shaft 6 extends through the heat exchanger 2 into the interior of the collecting pipe 14 and also that the forward end of the stirring shaft 6a is also provided with stirring vanes 9a in a manner similar to that of the stirring vanes 9.

In operating the apparatuses shown in FIGS. 1 and 3, particles of a thermoplastic resin such as polystyrene are supplied from the hopper 3 into the cylinder 4 of the extruder 1. For the sake of the clarity of the illustration, the resin is not shown in the drawings. The resin which has been fed to the extruder 1 is heated in the zone A up to a temperature of 130°–150° C. and melted therein. This molten resin is urged forwardly by the rotating screw 5, and is transferred into the zone B after passing through the curved pipe 10. In this zone B, a foaming agent, such as pentane or butane, which is normally in liquid state is forced into the molten resin from the inlet 11. This introduced foaming agent is thoroughly mixed in said molten resin while being heated up to about 170° C. The curved pipe 10 having a relatively small diameter is effective in preventing the backward flow of the foaming agent from the zone B to the zone A during this mixing process. The resulting foamable molten resin which has been thoroughly mixed in zone B is further forced therefrom to pass through the distributing pipe 12 and into the heat-exchanger 2 in which it is cooled by the cooling medium within chamber 15 which may consist of water or other appropriate liquids. Thereafter, the temperature of the resulting foamable resin is further lowered to a level, say about 100° C., which is suitable for foaming. The cooled foamable resin is then collected by the collecting pipe 14 and extruded from the die not shown into the air for expansion.

In case the foregoing procedure does not result in a sufficient dispersion of the foaming agent in the molten resin, it is solved easily by the re-mixing of the foaming agent and the molten resin by means of the screw 6a which is shown in the apparatus of FIG. 3. In case the apparatus shown in FIG. 1 is used, the inner diameter of the base section 12a of the distributing pipe 12 may be altered, as desired, to an appropriate size in accordance with the viscosity of the molten resin. However, in order to facilitate the passage of the molten resin through the cylinder 4a, there may be provided a gear pump at the base section 12a thereof.

The apparatuses of the present invention are each provided with a heat-exchanger which is of a good heat conductivity so as to serve as the means of cooling the foamable molten resin. This arrangement permits the foamable molten resin to be regulated quickly, in the stage immediately before being extruded, of its temperature so as to be optimum in condition for expansion. Accordingly, the apparatus of the present invention can be operated quite efficiently and, besides, the articles obtained are uniform in quality. In addition, the apparatus has a much reduced overall length as compared with the conventional extruding apparatuses which are equipped with a cooling zone which, in itself, is of a considerable length. Thus, the apparatus of the present invention provides an economical advantage that it requires only a limited area for installation.

What is claimed is:

1. An extruding apparatus, comprising in combination:
   housing means defining first and second substantially cylindrical chambers, said chambers being axially spaced and separate from one another;
   means disposed between said chambers for preventing direct axial flow therebetween;
   rotatable screw means disposed within said first chamber for feeding a resin from the inlet end of said first chamber toward the discharge end thereof, said first chamber constituting a heating zone;
   stirring means rotatably disposed within said second chamber, said stirring means including rotatable shaft means having stirring vanes thereon, said shaft means being axially aligned with and connected to said rotatable screw means for conjoint rotation therewith;
   inlet means communicating with said second chamber adjacent the inlet end thereof for injecting a foaming agent into the resin contained in said second chamber;
   conduit means for transferring the resin from said first chamber to said second chamber, said conduit means being of relatively small inner diameter sufficient to prevent flow of the foaming agent from said second chamber to said first chamber, said conduit means having one end thereof communicating with said first chamber adjacent the discharge end thereof, the other end of said conduit means communicating with said second chamber adjacent the inlet end thereof, said conduit means being disposed outside said housing means;
   cooling means connected to the discharge end of said second chamber for cooling the resin discharged therefrom, said cooling means including a distributing chamber and a collecting chamber interconnected by a plurality of laterally spaced through pipes for providing communication between said distributing chamber and said collecting chamber, said distributing chamber being in communication with the discharge end of said second chamber; and
   said cooling means further including means defining a heat exchanger chamber located between said distributing chamber and said collecting chamber in surrounding relationship to said plurality of pipes, and means for supplying a fluid to sai dheat exchanger chamber for cooling the resin within said pipe as it passes from said distributing chamber to said collecting chamber.

2. An extruding apparatus according to claim 1, further including second stirring means disposed within said collecting chamber, said second stirring means including second shaft means having stirring vanes thereon, said second shaft means extending through said heat exchanger chamber and being axially aligned with and connected to said first-mentioned shaft means for conjoint rotation therewith.

3. An extruding apparatus according to claim 1, wherein said inlet means communicates with said second chamber at a location which is substantially diametrically opposite the point where said conduit means communicates with said second chamber.

4. An extruding apparatus according to claim 1, wherein said plurality of pipes comprises a plurality of radially and circumferentially disposed pipes positioned in spaced but substantially parallel relationship, and said distributing and collecting chambers comprising radially enlarged chambers communicating with the opposite open ends of said plurality of pipes.

5. An extruding apparatus according to claim 1, wherein said conduit means comprises curved pipe means which constitutes the sole means for transferring resin between the adjacent axial ends of said first and second chambers, said pipe means having a small cross-sectional opening therethrough for permitting flow of resin from the discharge end of the first chamber into the inlet end of the second chamber while preventing the backflow of the foaming agent therethrough.

6. An extruding apparatus, comprising in combination:
housing means defining first and second elongated chambers, each having inlet and discharge ends;
rotatable extruding screw means in said first chamber for feeding resin therethrough and for melting same;
conduit means for transferring molten resin from said first chamber into said second chamber;
means for injecting a foaming agent into said second chamber;
rotatable stirring means in said second chamber for mixing said foaming agent with said molten resin and for forwarding the resulting mixture longitudinally through said second chamber;
a distributing member extending from the discharge end of said second chamber and defining a distributing passage which flares in a direction away from said second chamber;
a multiplicity of parallel, radially and circumferentially spaced conduits extending away from said distributing member and communicating therewith so that the mixture flows from said second chamber into said distributing passage and thence into said conduits;
a casing surrounding and spaced from said conduits and isolated from the ends of said conduits and means for supplying heat exchange fluid to and removing heat exchange fluid from said casing in order to adjust the temperature of the mixture flowing through the conduits;
a collecting member extending from the discharge ends of said conduits and defining a collecting passage which converges in a direction away from said discharge ends of said conduits; and
outlet means at the narrow end of said collecting passage.

References Cited

UNITED STATES PATENTS

| | | | |
|---|---|---|---|
| 1,912,374 | 6/1933 | Johnson | 18—12(SF) |
| 2,540,146 | 2/1951 | Stober | 18—12(SS)UX |
| 2,836,851 | 6/1958 | Holt | 18—12(SS) |
| 3,160,688 | 12/1964 | Aykanian et al. | 18—12(SN)X |
| 3,256,562 | 6/1966 | Heard, Jr. | 18—12(SN) |
| 3,444,283 | 5/1969 | Carlson, Jr. | 18—12(SN)X |

FOREIGN PATENTS

| | | | |
|---|---|---|---|
| 700,412 | 12/1964 | Canada | 18—12(SS) |

J. SPENCER OVERHOLSER, Primary Examiner

R. L. SPICER, Jr., Assistant Examiner

U.S. Cl. X.R.

18—30